Patented July 3, 1951

2,558,781

UNITED STATES PATENT OFFICE 2,558,781

METHOD OF TREATING WATER-SWOLLEN POLYMERS

John D. Pollard, Stamford, Conn., assignor to American Cyanamid Company, New York, N. Y., a corporation of Maine No Drawing. Application September 4, 1947, Serial No. 772,217

15 Claims. (Cl. 18—54)

This invention relates to the treatment of water-swollen polymers. More particularly the invention is concerned with a method of prolonging the gel life of a water-swollen, thermoplastic product of polymerization of a polymerizable mass comprising mainly acrylonitrile, e. g., polymeric acrylonitrile, a copolymer of acrylonitrile and acrylamide, etc., by contacting, as by immersion, such a polymerization product with an aqueous liquid composition containing at least one nitrogenous substance or humectant of the class consisting of urea and water-soluble, non-polymerizable alkyl- and alkanol-substituted ureas, e. g., monomethyl urea, symmetrical and unsymmetrical dimethyl ureas, trimethyl urea, monoethyl urea, mono-n-propyl and -isopropyl ureas, symmetrical and unsymmetrical diethyl ureas, monoethanol urea, etc. The aqueous liquid composition containing one, two, three or more of the aforementoned ureas (including urea itself), or mixtures thereof with a different humectant such, for instance, as a polyhydric alcohol or other polyhydroxy compound, is usually employed in the form of an aqueous solution containing a compound or mixture of compounds of the kind just mentioned. In some cases aqueous dispersions may be used, for example by forming a dispersion of an oil and an anueous solution of the humectant.

Various methods of producing filaments, films and other shaped products from polyacrylonitrile (polymeric acrylonitrile) and from thermoplastic copolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates, and nitrates, and that the resulting solutions be used in the manufacture of threads, films, etc. In neither of these patents is there any teaching or suggestion of any means of producing any dyed polymers or copolymers of acrylonitrile. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in the copending application of Arthur Cresswell, Serial No. 772,200, filed concurrently herewith, is based on the discovery that useful films, filaments, threads and other shaped articles, which are capable of being dyed, can be produced from acrylonitrile polymerization products of the kind described broadly in the first paragraph of this specification and more specifically in the aforementioned application and in the aforesaid patents, as well as hereinafter by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulan is a non-solvent for the polymerization product but will dissolve the solvent in which the said product is dissolved. Cresswell found that by keeping the temperature of the aqueous coagulating bath at or below about +10° C., e. g., within the range of —15° C., to about +5° C., the precipitated gels are clear or substantially clear, tough, ductile and, in filament, thread or other form, can be stretched to orient the molecules, thereby increasing the cohesiveness, tensile strength, toughness, resilience and otherwise improving the properties of the finished product.

The invention disclosed and claimed in the aforementioned Cresswell copending application Serial 772,200 is based on the further discovery that the shaped, precipitated gels, e. g., extruded, water-swollen filaments, which have been formed in a cold, liquid coagulant comprising water at low temperature of the order of that mentioned in the preceding paragraph can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or 30 or more times its original length, the molecules are oriented along the fiber axis and a product having increased tensile strength, pronounced fibrillation, toughness, resilience and other improved properties is obtained.

The invention disclosed and claimed in Cresswell's copending application Serial No. 772,202, also filed concurrently herewith, now abandoned in favor of Cresswell's copending application Serial No. 182,296, filed August 30, 1950, as a continuation-in-part of said application Serial No. 772,202, is based on the discovery that dyed, thermoplastic products of polymerization of a polymerizable mass comprising mainly acrylonitrile, e. g., polymeric acrylonitrile, can be produced by contacting a water-swollen mass of such a polymerization product with an acetate dye, e. g., by immersing such a mass in an aqueous bath containing such a dye. More particularly Cresswell discovered that shaped, precipitated gels or water-swollen structures or masses which have been produced as described briefly above and more fully in the aforementioned Cresswell applications are particularly adaptable or amenable to dyeing with an acetate dye. A more specific embodiment of the invention disclosed and claimed in Cresswell's application Serial No. 772,202 is based on his additional discovery that the gel life of an oriented or unoriented, water-swollen, thermoplastic product of polymerization of a polymerizable mass comprising mainly acrylonitrile can be prolonged by contacting such a product with an aqueous solution of a humectant, numerous examples of which are given in this Cresswell application as well as a cross-reference to the instant application.

The present invention is an improvement upon that embodiment of the invention disclosed in Cresswell application Serial No. 772,202 which is directed to the treatment of an oriented or unoriented, water-swollen, thermoplastic polymerization product of the kind aforementioned with an aqueous solution of a humectant in order to prolong or maintain its gel life. More particularly the present invention is based on my discovery that the gel life of a water-swollen, thermoplastic product of polymerization of a polymerizable mass comprising mainly acrylonitrile, e. g., such a product comprising at least 85% by weight of acrylonitrile, can be prolonged or maintained by contacting (e. g., by immersion) such a product with an aqueous liquid composition comprising a solution (or dispersion) containing urea, or a water-soluble, non-polymerizable alkyl- or alkanol-substituted urea, or mixtures thereof with one or more different humectants. Depending, for instance, upon the particular water-solubility characteristics of the particular urea employed or of the mixture of the urea compound with another humectant or humectants, e. g., a glycol or other polyhydric alcohol, the aqueous solution may contain from about 10% up to a percentage which corresponds to a completely saturated solution of the urea compound alone or admixed. For example, I may immerse the water-swollen polymerization product in an aqueous solution containing from about 10% to about 90% by weight thereof of a mixture of (1) a polyhydric alcohol and (2) at least one member of the class consisting of urea and water-soluble, non-polymerizable alkyl- and alkanol-substituted ureas, more particularly in an aqueous solution of from about 30% to about 50% by weight thereof of a mixture of urea and a glycol. Water-soluble, polymerizable substituted ureas, e. g., dimethylol urea, which, if used alone, may polymerize to an insoluble condition upon allowing the treated water-swollen or gelled polymerization product to stand for a prolonged period are not generally satisfactory when used as the sole urea compound present in the aqueous solution but, as shown in one of the following examples, may be used effectively in combination with urea alone or with urea and another humectant, more particularly a polyhydric alcohol and specifically glycerol.

In carrying my invention into effect a polymer or copolymer (thermoplastic copolymer) of acrylonitrile is prepared in accordance with methods now well known to those skilled in the art. In the preparation of copolymers a mixture of monomers comprising mainly, that is, a preponderant proportion by weight of, acrylonitrile is employed, and preferably the acrylonitrile constitutes at least about 85% by weight of the mixture of monomers. The monomeric mixture should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylaminde, N-methyl, -ethyl, -propyl, -butyl, etc., acrylamindes and methacrylamides, etc.); methacrylonitrile, ethacrylonitrile and other hydrocarbon-substituted acrylonitriles; and numerous other vinyl, acrylic and other compounds containing a single $CH_2=C<$ grouping which are copolymerizable with acrylonitrile to yield thermoplastic copolymers. Alkyl esters of alpha,beta-unsaturated polycarboxylic acids also may be copolymerized with acrylonitrile to form copolymers which, in water-swollen or gel (aquagel) state, may be treated in accordance with my invention in order to prolong or maintain their gel structure. Examples of such esters, are the dimethyl, -ethyl, -propyl, -isopropyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymeric or copolymeric acrylonitrile may be of any suitable molecular weight, but ordinarily will be within the range of 15,000 to 300,000 or higher, as calculated from viscosity measurements using the Staudinger equation (reference: U. S. Patent No. 2,404,713).

The polymeric or copolymeric (thermoplastic copolymeric) acrylonitrile is then processed further as described in the aforementioned Cresswell applications, especially application Serial No. 772,202, with the exception that the gel structure of the oriented or unoriented, dyed or undyed, water-swollen or gelled mass is prolonged or maintained by treating the said mass as broadly described in the first paragraph of this specification and more specifically elsewhere herein.

As is stated in Cresswell application Serial No. 772,202, the polymeric or copolymeric acrylonitrile is dissolved in a solvent, more particularly an aqueous solvent, from which the polymer (or copolymer) is precipitated or coagulated when the solution is brought into contact with water, advantageously water which is at a temperature not substantially exceeding +10° C., preferably at or below +5° C., e. g., at from −10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921. More specific examples of such water-soluble inorganic salts are zinc chloride, calcium chloride, lithium chloride, cadmium bromide, cadmium iodide, sodium thiocyanate, zinc thiocyanate, aluminium perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These latter solutions containing dissolved polymeric or copolymeric acrylonitrile are more fully described and are specifically claimed in the copending application of Arthur Cresswell, Serial No. 772,201, also filed concurrently herewith, now Patent No. 2,533,224, issued December 12, 1950.

Upon bringing the solution of the polymerization product, e. g., a soluble, thermoplastic product of polymerization of a polymerizable mass comprising at least about 85% by weight of acrylonitrile, into contact with water as above described, a water-swollen product having a gel structure and which may have been shaped, as by extrusion, into approximately the desired shape of the ultimate article is formed. The coagulated, water-swollen or gelled mass may be wet stretched to orient the molecules and improve its properties as described briefly above and more fully in the aforementioned Cresswell applications.

To prolong the gel life of the unoriented or oriented, water-swollen body until a subsequent operation, e. g., a dyeing step, it is treated with an aqueous liquid composition of the kind briefly described in the first paragraph of this specification and more particularly elsewhere herein. The treating composition, which contains a humectant comprising urea or a water-soluble, non-polymerizable alkyl- or alkanol-substituted urea, alone or admixed with another (different) humectant, may be applied to the water-swollen product in a manner such as described in the aforementioned Cresswell copending application Serial No. 772,202. For example, an unstretched water-swollen film or filament may be treated with an aqueous solution of the humectant prior to dyeing. Ordinarily the humectant-treated product, e. g., a filament, is mildly dried, for instance by allowing a spool on which the filament is wrapped to stand at room temperature, before it is immersed in the aqueous dye bath. Drying in no case should be so severe as to destroy the gel structure of the filament. By treating the unstretched filament with the humectant in aqueous solution or other suitable form, the gel life of the water-swollen polymerization product is prolonged so that more time may elapse before dyeing or other treatment of the material. The dyed material in filament or other form may be oriented to improve its properties as previously has been described. If desired, the mildly dried, oriented filament or thread may be fabricated, as by weaving, into cloth or other articles prior to dyeing.

In some cases it may be desirable to treat the water-swollen, unstretched product, after dyeing, with an aqueous solution of the humectant. The dyed, humectant-treated (e. g., urea-treated) product, e. g., a filament, which may or may not have been mildly dried, then may be stretched to orient the molecules as hereinbefore described. During stretching in hot water, the humectant is dissolved out of the filament.

A preferred procedure is to treat the water-swollen, oriented product with an aqueous solution of the humectant prior to a dyeing operation. For example, an oriented filament may be treated by immersing the spool on which the filament is wrapped in an aqueous solution of the humectant. After mildly drying the humectant-treated filament, it is then dyed with an acetate dye, for example as more fully described in the aforementioned Cresswell copending application Serial No. 772,202. If desired, the mildly dried, humectant-treated filament may be twisted, woven and the woven fabric then dyed, either with or without water washing of the fabric prior to dyeing it. Water washing to remove the humectant prior to dyeing the wet materials avoids accumulation of the humectant in the dye bath.

Another procedure which may be employed is to treat the dyed, oriented, water-swollen material in filament or other form with an aqueous solution of the humectant.

The treatment of the polymeric or copolymeric acrylonitrile in water-swollen or gel (aquagel) state with an aqueous liquid composition comprising a humectant, more particularly a humectant or mixture of humectants of the kind with which the present invention is concerned and which are described in the first paragraph of this specification, prolongs the gel life of the polymerization product in film, filament or other form and makes possible the dyeing of the material with an acetate dye under conditions which result in little, if any, dyeing of the completely dried material, that is, material in which the gel structure has been substantially completely destroyed. As has been mentioned hereinbefore, the treatment with an aqueous solution of the humectant is applicable either to the water-swollen or gelled, stretched (oriented) or unstretched (unoriented) polymerization product in film, filament or other form.

Various methods may be employed in contacting the water-swollen polymerization product with the humectant depending, for example, upon the shape of the product, the degree of impregnation desired and the manner in which the treated product subsequently is to be processed. For instance, an aqueous solution of the humectant or mixture of humectants may be applied by means of padding rolls, or by brushing, dipping (immersing for a brief period), spraying, etc. The humectant also may be applied in the form of an oil dispersion of the aqueous humectant solution.

The humectant treatment of the undyed or dyed, oriented, polymeric or copolymeric polymerization product is useful is facilitating fabrication of the material, as by twisting, weaving, etc. The water-swollen material may be immersed in a bath containing a humectant or humectants of the kind with which this invention is concerned or, in addition thereto, various other modifying agents may be present. For example, the bath also may contain an emulsion of a thread lubricant, e. g., a self-scouring mineral oil. Any suitable emulsifying agent may be used, e. g., a sulfonated fatty oil. Other lubricants or antistatic compounds or compositions similarly may be introduced into the bath containing the humectant, e. g., an emulsion of a reaction product of ethylene oxide and octadecyl guanidine, or of ethylene oxide and octadecyl guanamine, or an emulsion of a long-chain $\beta$-alkoxypropionitrile, e. g., octadecoxypropionitrile. These treatments with a combination of a humectant and another modifying agent may be applied to the water-swollen dyed or undyed, stretched or unstretched polymerization product but preferably are applied to the water-swollen, stretched material.

Illustrative examples of urea compounds that may be used in practicing the present invention are urea itself and any of the water-soluble, non-polymerizable alkyl- and alkanol-substituted ureas, examples of which have been given in the first paragraph of this specification. Because of its ready availability and cheapness I prefer to use urea itself. The urea compound may be used alone, if desired; or it may be admixed with another (different) humectant. Mixtures of different urea compounds of the kind aforementioned, as well as mixtures of such compounds with dimethylol urea (a polymerizable, water-soluble alkanol urea) may be employed. The water-soluble, non-polymerizable, alkanol-substituted ureas which, if desired, may be used alone in practicing my invention in all cases are those which contain more than one carbon atom in each alkanol grouping attached to a nitrogen atom of the urea.

Illustrative examples of other humectants which may be used in the form of an admixture with the urea compound are polyhydric alcohols, e. g., ethylene glycol, diethylene glycol, triethylene glycol, glycerol, pentaerythritol, dipentaerythritol, sorbitol, mannitol, neopentyl glycol, dineopentyl glycol, trimethylol propane, trimethylol butane, 1,4-butanediol, hexamethylene glycol, hexaethylene glycol, octaethylene glycol, polyethylene glycol substances having an average molecular weight of between about 200 and 4000, e. g., such substances having an average molecular weight of (a) about 200 and comprising mainly tetraethylene glycol, (b) about 300 and comprising mainly hexaethylene glycol, (c) about 400 and comprising mainly nonaethylene glycol, (d) about 1500, (e) about 3000, etc.; sulfonated fatty acid glycerides, e. g., highly sulfonated castor oil; alkanolamines, e. g., triethanolamine, etc.; N-acyl alkanolamines, e. g., N- acetyl ethanolamine, etc.; and others. Some compounds, which are less effective as humectants than others in preserving the gel structure of the water-swollen polymerization product, have excellent plasticizing action on the material. Examples of such compounds are ethylene cyanohydrin and glycolonitrile. Such compounds also may be used in the form of an admixture with the urea compound.

The treatment of the water-swollen polymerization product with an aqueous solution of a humectant (or mixture or humectants) of the kind with which the present invention is concerned, e. g., such a solution containing from about 10 to about 90%, preferably from about 30 to about 50%, by weight thereof of the humectant, makes possible a mild drying, e. g., air-drying, of films, filaments (mono- and multifilaments), bristles, rods, bars, etc., of water-swollen or gelled polymeric or thermoplastic copolymeric acrylonitrile so that they later can be dyed rapidly and effectively with an acetate dye. For example, a highly stretched, water-swollen multifilament thread of the polymerization product may be treated with an aqueous solution of the humectant, allowed to air dry, and thereafter may be twisted, wound and then woven, knitted or otherwise worked to form a fabric or other textile material. The fabric then may be treated with an acetate dye as hereinbefore described, after which it is washed and dried (or allowed to dry) irreversibly.

In order that those skilled in the art better may understand how the present invention may be carried into effect, the following examples are given by way of illustration and not by way of limitation. All parts and percentages are by weight.

*Example 1*

A solution of about 15.3% of a copolymer of about 90% acrylonitrile and about 10% acrylamide dissolved in an approximately 55% aqueous solution of sodium thiocyanate was extruded through a single-hole, glass spinnerette into circulating water at 3.5° C., thereby coagulating the extruded mass and yielding a water-swollen, unstretched monofilament of a thermoplastic product of polymerization of a polymerizable mass comprising at least about 85%, more particularly about 90%, by weight or acrylonitrile and the remainder acrylamide. Samples of this wet monofilament having a diameter of 30 mils were soaked in the humectant solutions and concentrations thereof shown below for 18–20 hours, after which they were removed from the bath, wiped and then air dried in a mild current of air at 22.8° C. and 26% relative humidity for 1½ hours. A sample of the untreated monofilament was dry after drying in this manner for only 30 minutes. It was clear, brittle and had a diameter of 20 mils. The properties of the humectant-treated filaments are shown below:

| Test No. | Humectant Bath | Diameter of Dried Filament, Mils | Properties |
| --- | --- | --- | --- |
| 1 | 50% aqueous urea | 28–29 | White, opaque, highly flexible, ductile. |
| 2 | Aqueous solution of 30% urea and 20% glycerol. | 26 | Whitish, opaque, highly flexible, ductile. |
| 3 | Aqueous solution of 20% urea and 30% glycerol. | 25–26 | Clear, highly flexible, ductile. |

The mildly dried, humectant-treated monofilaments were then placed for 3 hours in a 40° C. dye bath containing a small amount of highly sulfonated castor oil as a dispersing agent and 0.6 gram per liter of an acetate blue dye, more particularly 4-(β-hydroxyethylamino)-1-methylaminoanthraquinone, the formula for which is

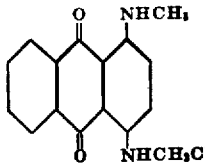

(A. A. T. C. C. Prototype No. 228)

Thereafter the samples were removed from the bath, washed with water and air dried. All of the samples were dyed a dark blue. In marked contrast the air-dried filament which had not been treated with a humectant, when immersed in the same bath for the same period of time, remained undyed.

The greater diameters (25–29 mils) of the dried filaments, after treatment with an aqueous solution of either urea or a mixture of urea and glycerol, as compared with the diameter of the dried untreated filament (20 mils), show the effect of these humectant solutions in maintaining the gel structures of the water-swollen filaments, while the results of the dye tests show the practical advantages of this treatment.

*Example 2*

Same as Example 1 with the exception that the water-swollen filaments were immersed for 17 hours in the humectant solutions shown below, and the treated filaments were air dried in a mild current of air at 27.8° C. and 33% relative humidity for 1½ hours. The properties of the humectant-treated filaments are shown below:

| Humectant Bath | Diameter of Dried Filament, Mils | Properties |
| --- | --- | --- |
| Aqueous solution of 15% triethylene glycol and 15% urea. | 23 | Clear, flexible, ductile. |
| Aqueous solution of 20% triethylene glycol and 20% urea. | 24–25 | Clear, flexible, more ductile than previous specimen. |
| Aqueous solution of 25% triethylene glycol and 25% urea. | 26 | Slightly opaque, flexible, ductile. |

All of the air-dried, humectant-treated samples were dyed a dark blue, which appeared to be of equal depth, using the same dye bath and procedure described in Example 1.

*Example 3*

An interpolymer of acrylonitrile and acrylamide was prepared by dissolving 198 parts of acrylonitrile in 2190 parts of water to which had been added 228.5 parts of a 9.65% aqueous acrylamide solution. The temperature of the solution was brought to 40° C. and then 5 parts of sodium metabisulfite was added, followed by 5 parts of ammonium persulfate. By external cooling, the reaction temperature was held to a maximum of 41.4° C., after which the temperature returned to 40° C. at the end of 40 minutes. The mixture was stirred at 40° C. until the total reaction time was 2 hours. The precipitated copolymer of 90% acrylonitrile and 10% acrylamide was filtered off, washed and dried. One gram of this copolymer, dissolved in 60% sodium thiocyanate to make 100 ml. of solution at 20° C., gave a solution having a viscosity of 17 centipoises at 40° C.

Twelve and two-tenths parts of the dry, powdered copolymer was dissolved in 87.8 parts of 55% aqueous sodium thiocyanate solution. The ball-fall viscosity of the resulting solution at 61° C. was 56 seconds. The filtered and deaerated solution was extruded through a single-hole spinnerette which was attached to an electrically heated coupling. The temperature of the solution inside the spinnerette was 60° C. By contacting the face of the spinnerette with the surface of the coagulating bath, which was water at 4° C., the extruded monofilament thread was extruded vertically downward to a roller and thence back to the surface of the coagulating bath, giving a bath travel of 36 inches. The thread was then stretched 1130% in boiling water. The stretched thread was wound on a bobbin while still wet, and a spray of water was maintained on the bobbin to prevent any drying out of the thread. The stretched monofilament was stored under water in the gel state until treated as described below.

Five lengths of the water-swollen, stretched monofilaments were allowed to stand for 5 minutes in a 50% aqueous solution of urea. The treated filaments were dried at 30° C. and 63% relative humidity, and were then wound on small glass reels which were placed in a 60° C. oven for 30 minutes. The reels containing the mildly dried filaments, which still had a gel structure, were immersed in individual dye baths containing each of the following dyes:

1. Calco Acetate Green 2B (A. A. T. C. C. Prototype No. 229)

2. 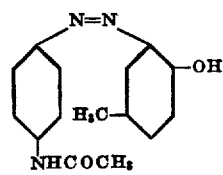
4-acetamino-2'-hydroxy-5'-methylazobenzene (an acetate yellow dye)

3. 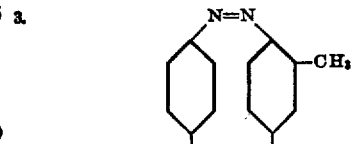
4-[di-(β-hydroxyethyl)-amino]-2-methyl-4'-nitroazobenzene (an acetate red dye, A. A. T. C. C. Prototype No. 236)

4. 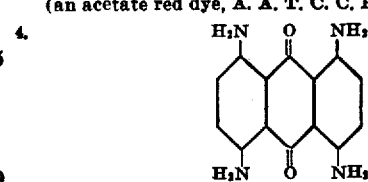
1,4,5,8-tetraminoanthraquinone (an acetate blue dye).

5. 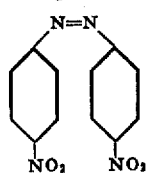
p,p'-Dinitroazobenzene (A. A. T. C. C. Prototype No. 43)

The baths were prepared by adding to a weighed amount of each of the dyestuffs a small quantity of highly sulfonated castor oil and water, and forming a paste of the dye. Boiling water was added to the pastes and then the dye dispersions, each of which was equivalent to 0.66 gram per liter of dyestuff, were allowed to cool to 40° C. Dyeing was carried out for 3 hours at 40° C. The reels were removed from the baths, and the wrapped filaments were thoroughly washed with water, after which the reels were placed in a 60° C. oven for 1 hour. All of the dry monofilaments were deeply and uniformly dyed, the dye substantially completely impregnating the filament.

*Example 4*

Some monofilament which had been spun from the copolymer described under Example 3 and stretched 1130% in boiling water was used in this example. The stretched monofilament had been stored under water in the gel state. Specimens of the water-swollen or gelled monofilament were immersed for 2 hours at room temperature in each of the humectant treating baths described below, as well as in water alone as a control. After removal from the baths the treated filaments were air dried at room temperature for about 20 hours and then were heated in a 60° C. oven for 30 minutes. The dried specimen which had been immersed in water alone was clear and brittle and had a diameter of 1.9 mils. The treating baths used and the diameters of the dried filaments that had been immersed in each of the baths are shown below:

| Test No. | Humectant Bath | Diameter of Dried Filament, Mils |
|---|---|---|
| 1 | 50% aqueous urea | 3.8 |
| 2 | Aqueous solution of 25% urea and 25% glycerol | 2.5 |
| 3 | 50% aqueous monomethyl urea | 3.2 |
| 4 | Aqueous solution of 25% monomethyl urea and 25% glycerol | 2.1 |
| 5 | 50% aqueous monoethyl urea | 3.1 |
| 6 | Aqueous solution of 25% monoethyl urea and 25% glycerol | 2.2 |
| 7 | 50% aqueous monoethanol urea | 3.0 |
| 8 | Aqueous solution of 25% monoethanol urea and 25% glycerol | 2.8 |
| 9 | Aqueous solution of 25% urea and 25% dimethylol urea | 3.4 |
| 10 | Aqueous solution of 25% glycerol and 25% of a 50-50 mixture of urea and dimethylol urea | 2.7 |

All of the dried, treated filaments had a water-swollen or gel structure, were flexible and were effectively dyed when immersed for 3 hours in an acetate dye bath maintained at 40° C. and containing 4 - (β-hydroxyethylamino)-1-methylaminoanthraquinone, A. A. T. C. C. Prototype No. 228. (The bath was prepared by pasting 1 part of the dye with small amounts of water and of highly sulfonated castor oil. Thereafter water at 80° C. was gradually stirred in until a total of 1500 parts had been used. This produced a dispersion containing approximately 0.66 gram per liter of dye.) In marked contrast when the dried, untreated filament was immersed in the same dye bath for the same length of time, it was undyed.

The greater diameters (2.1-3.8 mils) of the dried filaments, after treatment with the above-mentioned treating agents, as compared with the diameter of the dried untreated filament (1.9 mils), show the effect of these humectant solutions or treating compositions in maintaining the gel structures of the water-swollen filaments, while the results of the dye test show the practical advantages of the treatment. All of the dry monofilaments were deeply and uniformly dyed.

If desired, lubricants, plasticizers or pseudoplasticizers or other modifiers may be incorporated into the shaped polymeric or copolymeric articles at an appropriate stage in their process of manufacture. A preferred stage in which these various modifiers may be applied is during the gel state of the thread or film. For example, highly stretched multifilament thread may be treated while in this condition with an emulsion of a reaction product of ethylene oxide and octadecyl guanidine alone or in conjunction with an aqueous liquid composition of the kind described in the first paragraph of this specification, e. g., an aqueous solution of urea or of a mixture of urea and a glycol such, for instance, as diethylene glycol, triethylene glycol, etc. In this swollen state the fibers are more receptive to the taking up of an aqueous solution, dispersion or emulsion. Other lubricant or anti-static treatments which may be applied in this manner are emulsions of long-chain β-alkoxypropionitriles, e. g., octadecoxypropionitrile; still another is an emulsion of a reaction product of ethylene oxide and octadecyl guanamine. These lubricants or anti-static compositions may be applied on the gel thread after it has been dyed.

The term "filament" as used generically herein and in the appended claims is intended to include within its meaning both monofilaments and multifilaments.

I claim:

1. The method which comprises precipitating a soluble, thermoplastic product of polymerization of a polymerizable mass comprising mainly acrylonitrile in approximately its desired shape from a water-coagulable solution thereof by contacting the latter with a liquid coagulant comprising water, said coagulant being at a temperature not exceeding +10° C. and said polymerization product being dissolved in a concentrated aqueous solution of a water-soluble salt which yields highly hydrated ions in aqueous solution, thereby to obtain a shaped, tough gel which can be molecularly oriented by wet stretching; stretching the precipitated, water-swollen, shaped product in the presence of moisture and at a temperature within the range of about 70° C. to about 110° C. to obtain a molecularly oriented product; and contacting the molecularly oriented product in water-swollen state with an aqueous liquid composition containing a humectant comprising at least one nitrogenous substance selected from the class consisting of urea and water-soluble, non-polymerizable, alkyl- and alkanol-substituted ureas, said humectant constituting from about 10% to about 90% by weight of the said liquid composition, but not exceeding a percentage which results in a completely saturated solution of the humectant.

2. A method as in claim 1 wherein the thermoplastic polymerization product is polymeric acrylonitrile having a molecular weight within the range of 15,000 to 300,000 as calculated from viscosity measurements using the Staudinger equation.

3. A method as in claim 1 wherein the nitrogenous substance is urea.

4. The method which comprises precipitating a soluble, thermoplastic product of polymerization of a polymerizable mass comprising at least about 85% by weight of acrylonitrile in approximately its desired shape from a water-coagulable solution thereof by extruding the latter into a liquid coagulant comprising mainly water, said coagulant being at a temperature not exceeding +10° C. and said polymerization product being dissolved in a concentrated aqueous solution of a water-soluble inorganic salt which yields highly hydrated ions in aqueous solution, thereby to obtain a shaped, tough gel which can be molecularly oriented by wet stretching; stretching the precipitated, water-swollen, shaped product while immersed in water maintained at a temperature within the range of about 70° C. to about 100° C. to effect molecular orientation of the said product; and immersing the molecularly oriented product in a water-swollen state in an aqueous liquid composition containing a humectant comprising at least one nitrogenous substance selected from the class consisting of urea and water-soluble, non-polymerizable, alkyl- and alkanol-substituted ureas, said nitrogenous substance constituting from about 10% to about 50% by weight of the said liquid composition, but not exceeding a percentage which results in a completely saturated solution of the said nitrogenous substance.

5. A method as in claim 4 wherein the thermoplastic polymerization product is extruded in filamentary form.

6. The method which comprises extruding in filamentary form a viscous, water-coagulable solution of a thermoplastic product of polymerization of a polymerizable mass comprising at least about 85% by weight of acrylonitrile, said polymerization product being dissolved in a concentrated aqueous solution of a water-soluble thiocyanate, and said viscous, water-coagulable solution being extruded into a liquid coagulant comprising mainly water, said coagulant being at a temperature within the range of −15° C. to +10° C., thereby to obtain a shaped, tough, gelled filament which can be molecularly oriented along the fiber axis by wet stretching; stretching the said gelled filament at least 100% while immersed in water maintained at a temperature within the range of about 70° C. to about 100° C. to effect orientation of the molecules of the polymerization product along the fiber axis; contacting the molecularly oriented filamentary material in gel state with an aqueous solution containing from about 10% to about 90% by weight thereof of a mixture of (1) a polyhydric alcohol and (2) at least one member of the class consisting of urea and water-soluble, non-polymerizable, alkyl- and alkanol-substituted ureas, the said filamentary material after being contacted with the said aqueous solution having a longer gel life upon exposure to air at room temperature than the same product prior to treatment with the said aqueous solution.

7. A method as in claim 6 wherein the polyhydric alcohol is a glycol and the nitrogenous substance is urea.

8. A method as in claim 7 wherein the glycol is diethylene glycol.

9. A method as in claim 7 wherein the glycol is triethylene glycol.

10. A method as in claim 6 wherein the thermoplastic polymerization product is a thermoplastic product of polymerization of a polymerizable mass comprising at least about 85% by weight of acrylonitrile and the remainder acrylamide, the polyhydric alcohol is a glycol and the nitrogenous substance is urea.

11. The method which comprises extruding in filamentary form a viscous, water-coagulable solution of a thermoplastic product of polymerization of a polymerizable mass comprising mainly acrylonitrile, said polymerization product being dissolved in a concentrated aqueous solution of a water-soluble salt which yields highly hydrated ions in aqueous solution and having a molecular weight within the range of 15,000 to 300,000 as calculated from viscosity measurements using the Staudinger equation, and said viscous, water-coagulable solution being extruded into a liquid coagulant comprising mainly water, said coagulant being at a temperature not exceeding about +5° C., thereby to obtain a shaped, tough, gelled filament which can be molecularly oriented along the fiber axis by wet stretching; stretching the said gelled filament at least about 200% while immersed in water maintained at a temperature within the range of about 90° C. to about 100° C. to effect orientation of the molecules of the polymerization product along the fiber axis; immersing the molecularly oriented filamentary material in gel state in an aqueous liquid composition containing from about 10% to about 90% by weight thereof of a mixture of (1) a polyhydric alcohol and (2) urea; removing the said filamentary material from the said aqueous liquid composition; and thereafter allowing the thusly treated, gelled, filamentary material to dry in air.

12. A method as in claim 11 wherein the thermoplastic polymerization product is a thermoplastic product of polymerization of a polymerizable mass comprising at least about 85% by weight of acrylonitrile, and the aqueous liquid composition in which the molecularly oriented filaments in gel state are immersed is an aqueous solution of from about 30% to about 50% by weight thereof of a mixture of urea and a glycol.

13. A method as in claim 12 wherein the aqueous liquid composition in which the molecularly oriented filaments in gel state are immersed is an aqueous solution of about 20% each, by weight of the solution, of urea and triethylene glycol.

14. A method as in claim 4 wherein the polymerization product is dissolved in a concentrated aqueous solution of a thiocyanate, and the molecularly oriented product in a water-swollen state is immersed in an aqueous solution containing urea in an amount corresponding to from about 10% to about 50% by weight of the said solution.

15. The method which comprises bringing a viscous, water-coagulable solution containing a thermoplastic product of polymerization of a polymerizable mass comprising at least about 85% by weight of acrylonitrile into contact with a liquid coagulant comprising mainly water, said polymerization product having a molecular weight of between 15,000 and 300,000 as calculated from viscosity measurements using the Staudinger equation, and being dissolved in a concentrated aqueous solution of a water-soluble salt which yields highly hydrated ions in aqueous solution, and said coagulant being at a temperature within the range of −15° C. to +10° C., thereby to precipitate the said polymerization product from the said solution as a transparent, dyeable gel having considerable elasticity and toughness, as well as better dye receptivity than the dried gel in which the gel structure has been destroyed; stretching the said gel while in contact with water at a temperature within the range of about 70° C. to about 100° C. to cause orientation of the molecules of the polymerization product; and prolonging the gel life of the said dyeable gel until it is subsequently dyed by contacting the said gel with an aqueous composition comprising a humectant including at least one nitrogenous substance selected from the class consisting of urea and water-soluble, non-polymerizable, alkyl- and alkanol-substituted ureas, said humectant constituting from about 10% to about 90% by weight of the said liquid composition, but not exceeding a percentage which results in a completely saturated solution of the humectant.

JOHN D. POLLARD.

REFERENCES CITED

The following references are of record in the file of this patent:

UNITED STATES PATENTS

| Number | Name | Date |
| --- | --- | --- |
| 2,083,982 | Bosland | June 15, 1937 |
| 2,140,921 | Rein | Dec. 20, 1938 |
| 2,376,890 | Alles | May 29, 1945 |
| 2,431,956 | Moody | Dec. 2, 1947 |

FOREIGN PATENTS

| Number | Country | Date |
| --- | --- | --- |
| 251,993 | Great Britain | Oct. 21, 1926 |
| 285,942 | Great Britain | Feb. 23, 1928 |